United States Patent
Bibeault

(10) Patent No.: US 9,739,795 B2
(45) Date of Patent: Aug. 22, 2017

(54) ON-AXIS MOUNTING OF AN INERTIAL MEASUREMENT UNIT (IMU) WITHIN AN OPTICAL SYSTEM

(71) Applicant: BAE Systems Information and Electronic Systems Integration Inc., Nashua, NH (US)

(72) Inventor: Steven P. Bibeault, Mason, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/285,148

(22) Filed: Oct. 4, 2016

(65) Prior Publication Data
US 2017/0023601 A1 Jan. 26, 2017

Related U.S. Application Data

(62) Division of application No. 13/608,087, filed on Sep. 10, 2012, now Pat. No. 9,482,685.
(Continued)

(51) Int. Cl.
*G01P 15/00* (2006.01)
*G01P 1/02* (2006.01)
*G01C 19/08* (2006.01)

(52) U.S. Cl.
CPC .............. *G01P 1/023* (2013.01); *G01C 19/08* (2013.01); *G01P 1/026* (2013.01)

(58) Field of Classification Search
CPC . G01P 1/02; G01P 1/023; G01P 1/026; G01C 19/08; G02B 26/108; G02B 26/12; G02B 5/09; H04N 1/113
See application file for complete search history.

(56) References Cited

U.S. PATENT DOCUMENTS 5,325,171 A * 6/1994 Shimizu ................. G01M 11/00
250/252.1
5,546,309 A * 8/1996 Johnson ................. G01S 3/7862
244/164

(Continued)

FOREIGN PATENT DOCUMENTS

JP WO 2008099642 A1 * 8/2008 ........... G02B 27/646
JP 2010078842 4/2010
(Continued)

*Primary Examiner* — Laura Martin
*Assistant Examiner* — Samir M Shah
(74) *Attorney, Agent, or Firm* — Scott J. Asmus; Finch & Maloney PLLC

(57) ABSTRACT

Techniques and architecture are disclosed for providing an optical system having an on-axis, internally mounted inertial measurement unit (IMU). In some cases, an IMU may be mounted within an interior region/cavity of an inner housing, which intern is configured to rotate within an outer housing. In some instances, a mirror assembly may be operatively coupled with the inner housing and permitted to rotate simultaneously with the IMU. Rotation of the inner housing may be achieved, in some example cases, by use of a suitable motor. In some instances, positioning componentry may be operatively coupled with one or more of the IMU and/or mirror assembly. Improvements in mechanical stability, system dimensions, and/or protection from external/environmental hazards may be realized, in some example cases.

6 Claims, 7 Drawing Sheets

Related U.S. Application Data

(60) Provisional application No. 61/534,049, filed on Sep. 13, 2011.

(56) References Cited

U.S. PATENT DOCUMENTS

| | | | | |
|---|---|---|---|---|
| 5,672,866 A * | 9/1997 | Messina | | G01C 11/02 250/236 |
| 6,191,851 B1 * | 2/2001 | Kirkham | | G01J 3/52 250/252.1 |
| 6,555,803 B1 * | 4/2003 | Bremer | | G01C 11/02 250/203.1 |
| 6,687,645 B2 * | 2/2004 | Curey | | G01C 21/18 248/182.1 |
| 7,136,726 B2 * | 11/2006 | Greenfeld | | F41G 5/14 348/143 |
| 7,308,342 B2 * | 12/2007 | Greenfeld | | G01C 11/02 701/3 |
| 7,496,241 B1 * | 2/2009 | Reneker | | G01C 11/02 382/260 |
| 7,911,659 B2 * | 3/2011 | Ueno | | H04N 1/00013 358/406 |
| 8,067,738 B1 * | 11/2011 | Heath | | G01J 3/0262 250/338.1 |
| 8,217,326 B1 * | 7/2012 | Matthews | | G01J 1/18 250/203.1 |
| 8,258,449 B1 * | 9/2012 | Matthews | | G01J 1/0492 250/203.1 |
| 8,948,471 B2 | 2/2015 | Fichtinger | | |
| 9,063,391 B2 * | 6/2015 | Yavin | | G01C 11/025 |
| 2008/0262345 A1 * | 10/2008 | Fichtinger | | A61B 6/504 600/426 |
| 2015/0097950 A1 * | 4/2015 | Wang | | H04N 5/23287 348/144 |

FOREIGN PATENT DOCUMENTS

| | | | | |
|---|---|---|---|---|
| JP | 2010078842 A * | 4/2010 | | G02B 27/646 |
| WO | 2008099642 | 8/2008 | | |

* cited by examiner

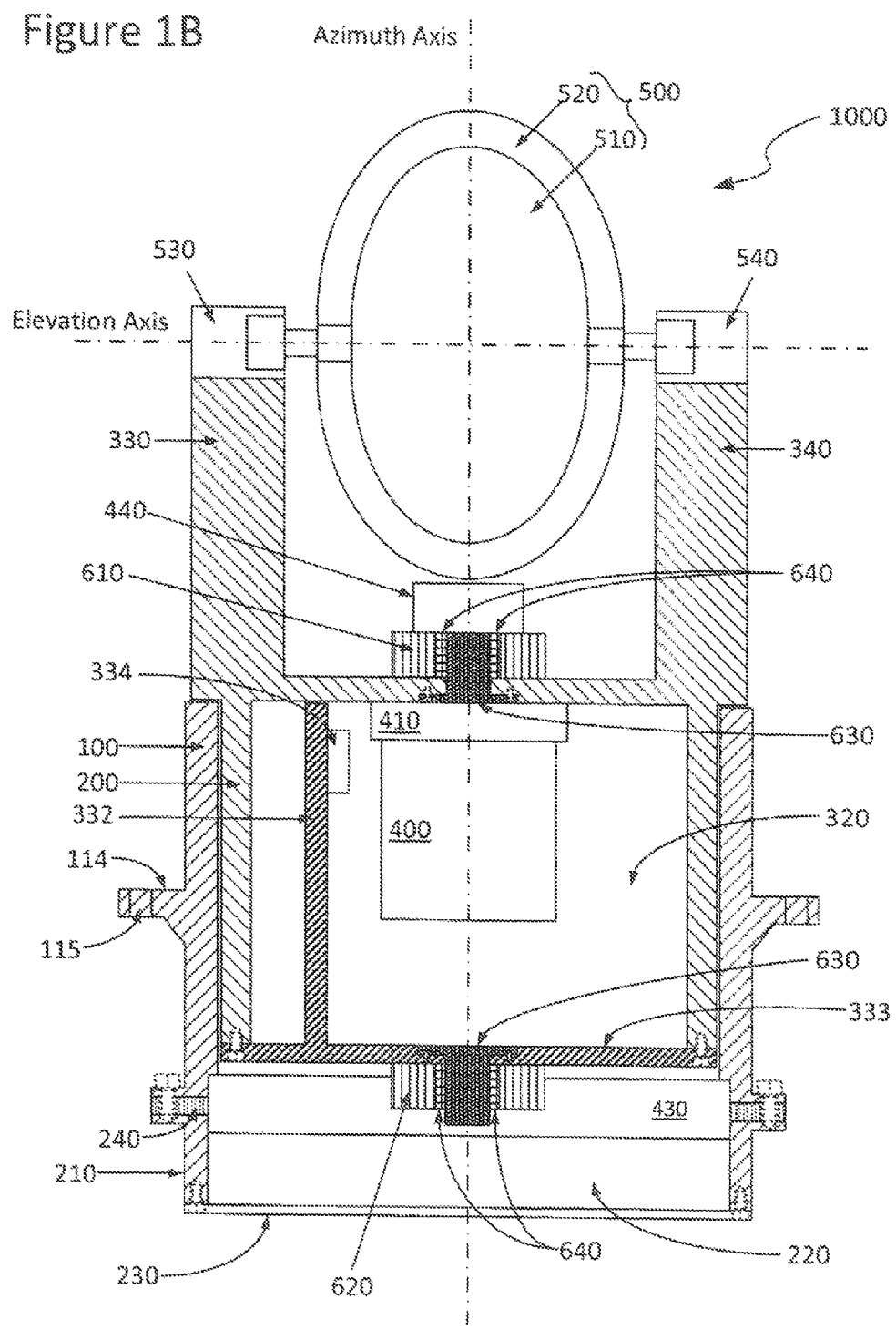

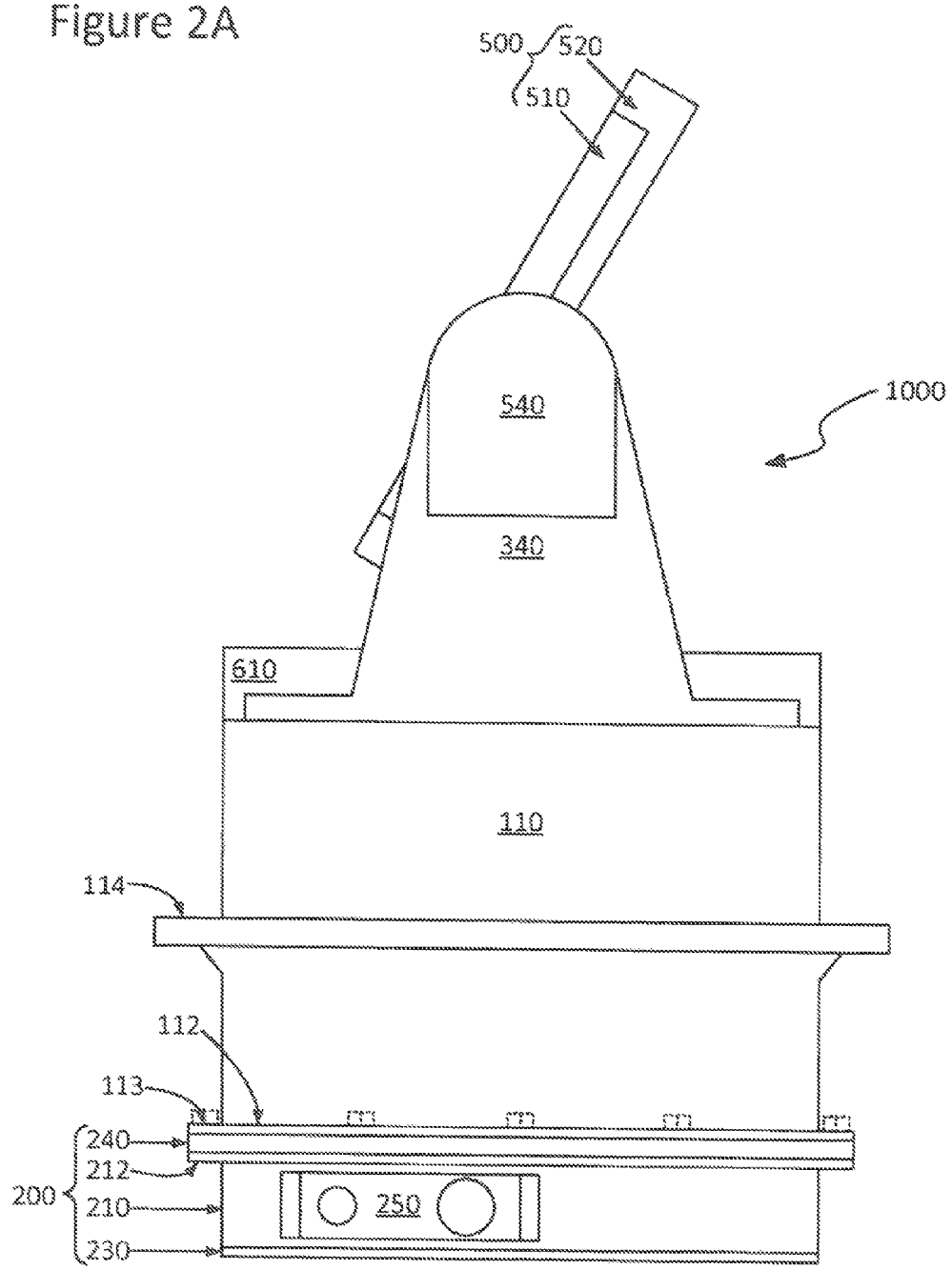

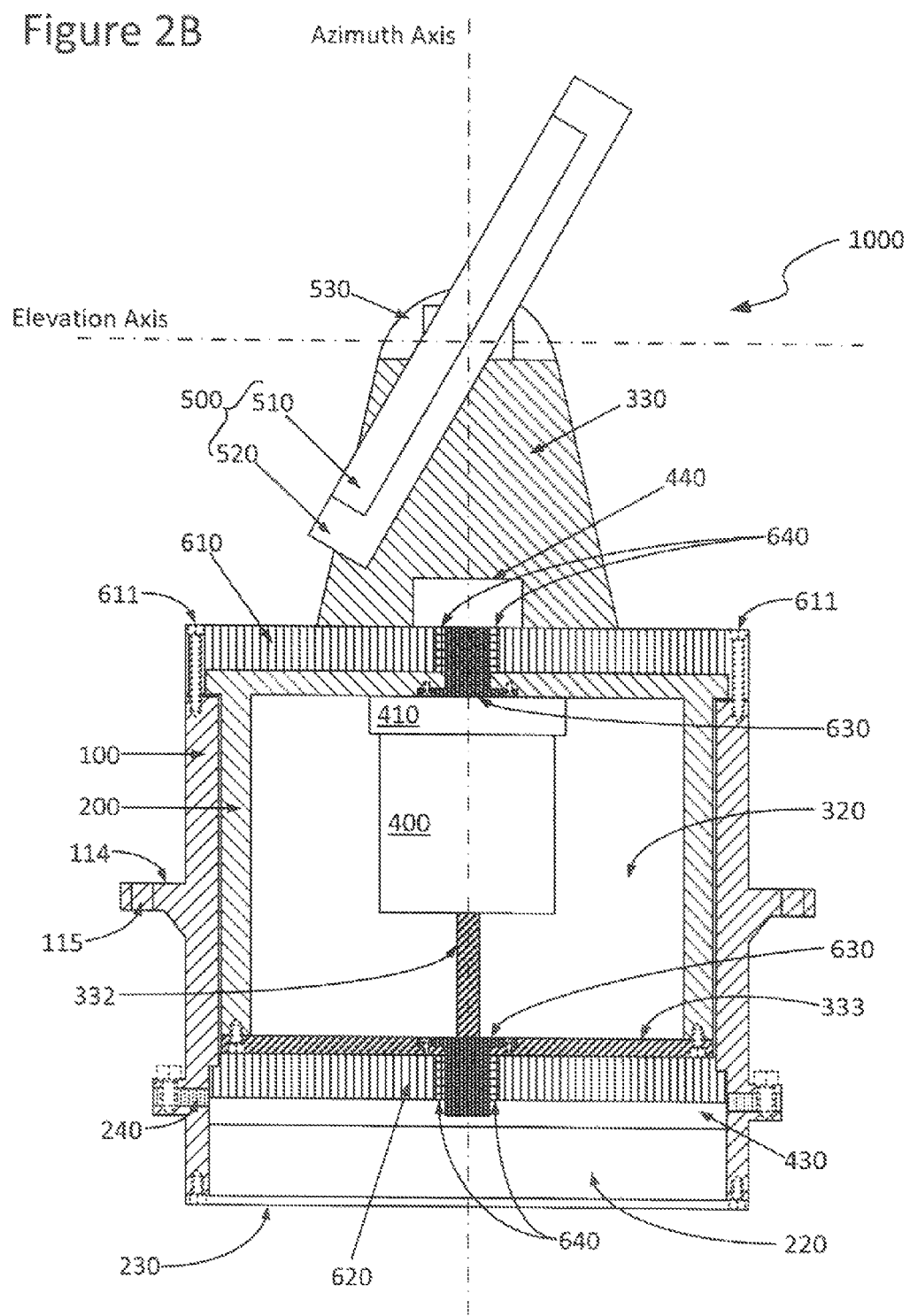

ON-AXIS MOUNTING OF AN INERTIAL MEASUREMENT UNIT (IMU) WITHIN AN OPTICAL SYSTEM

CROSS-REFERENCE TO RELATED APPLICATIONS

This application is a divisional of U.S. application Ser. No. 13/608,087 filed Sep. 10, 2012 and claims the benefit of U.S. Provisional Patent Application No. 61/534,049, filed on Sep. 13, 2011, which is herein incorporated by reference in its entirety.

FIELD OF THE DISCLOSURE

The invention relates to optical systems, and more particularly to inertial measurement unit (IMU) mounting for an optical system.

BACKGROUND

Optical systems involve a number of non-trivial challenges, and optical systems including inertial measurement units (IMUs) have faced particular complications.

SUMMARY

One example embodiment of the present invention provides a system including a first housing having a first cavity provided therein, a second housing having a second cavity provided therein, wherein the second housing is disposed within the first cavity and permitted to rotate therein, and an optical assembly operatively coupled with the second housing, wherein rotation of the second housing results in rotation of the optical assembly therewith. In some cases, the system further includes an inertial measurement unit (IMU) operatively coupled with the second housing and positioned within the second cavity, wherein rotation of the second housing results in rotation of the IMU therewith. In some such cases, the system further includes a mounting site provided within the second cavity, wherein the IMU is operatively coupled with the second housing at the mounting site. In some other such cases, the IMU is operatively coupled with the second housing along an azimuthal axis of the system. In some instances, the optical assembly includes an optical sensor, a mirror configured to direct light to the optical sensor, an optical assembly motor operatively coupled with the mirror and configured to cause movement thereof, and an optical assembly encoder operatively coupled with the optical assembly motor and configured to communicate therewith. In some such instances, the mirror includes at least one of a stabilized mirror, a tilt mirror, and/or a two-axis mirror. In some example cases, the system further includes a drive assembly operatively coupled with the second housing and configured to cause rotation thereof within the first housing. In some such cases, the drive assembly includes a first bridge assembly including a first arrangement of bearings, a second bridge assembly including a second arrangement of bearings, a drive shaft positioned between the first and second bridge assemblies and operatively coupled with the second housing, a drive assembly motor operatively coupled with the drive shaft and configured to cause rotation thereof, and a drive assembly encoder operatively coupled with the drive assembly motor and configured to communicate therewith. In some such instances, at least one of the first arrangement of bearings and/or the second arrangement of bearings includes duplex bearings, and the drive shaft is positionable within an inner race of such duplex bearings. In some other such instances, the first and second arrangements of bearings include duplex bearings, wherein one of the first and second arrangements of bearings is clamped axially while the other of the first and second arrangements of bearings remains unclamped. In some cases, the system further includes a base assembly operatively coupled with the first housing, wherein the base assembly includes at least one of a thermal isolator and/or a power supply interface. In some example cases, the second housing is permitted to rotate through an angle in the range of less than or equal to about ±40°. In some instances, the system is configured to be operatively coupled with at least one of a chassis, a piece of equipment, a vehicle, a building, and/or a bunker. In some instances, the system is environmentally sealed.

Another example embodiment of the present invention provides a system including a first housing having a first cavity provided therein, a second housing having a second cavity provided therein, wherein the second housing is disposed within the first cavity and permitted to rotate therein, an optical assembly operatively coupled with the second housing, an inertial measurement unit (IMU) operatively coupled with the second housing and positioned within the second cavity, and a drive motor operatively coupled with the second housing and configured to cause rotation thereof, wherein rotation of the second housing results in rotation of the optical assembly and the IMU therewith. In some cases, the second housing is permitted to rotate through an angle in the range of less than or equal to about ±40°. In some instances, the optical assembly is permitted to rotate about at least one of an azimuthal axis of the system and/or an elevation axis of the system, and the IMU is permitted to rotate about the azimuthal axis of the system. In some example cases, the IMU is configured to account for effects of rotation on measurements that it makes. In some example instances, the IMU is a one-axis, two-axis, or three-axis IMU.

Another example embodiment of the present invention provides a system including a first housing having a first cavity provided therein, a second housing having a second cavity provided therein, wherein the second housing is disposed within the first cavity and permitted to rotate therein, an inertial measurement unit (IMU) operatively coupled with the second housing and positioned within the second cavity, a mirror operatively coupled with the second housing, an elevation motor operatively coupled with the mirror and configured to cause rotation thereof about an elevation axis of the system, and an azimuthal motor operatively coupled with the second housing and configured to cause rotation thereof about an azimuth axis of the system, wherein rotation of the second housing results in rotation of the mirror and the IMU therewith about the azimuth axis of the system.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIGS. 1A and 1B are a front perspective and front cross-sectional view, respectively, of a system configured in accordance with an embodiment of the present invention.

FIGS. 2A and 2B are a side perspective and a side cross-sectional view, respectively, of a system configured in accordance with an embodiment of the present invention.

Figure 1A:
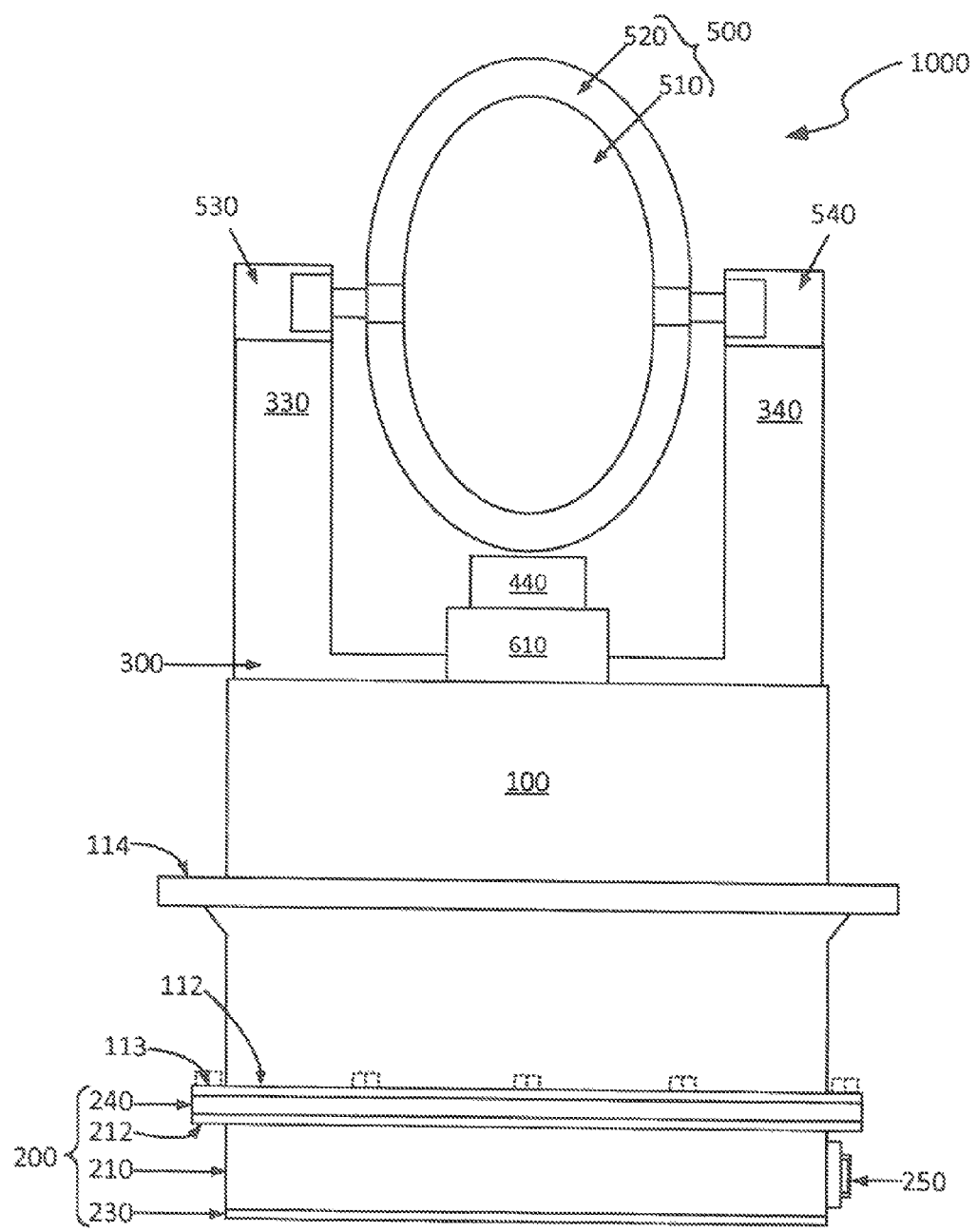

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques and architecture are disclosed for providing an optical system having an on-axis, internally mounted inertial measurement unit (IMU). In some cases, an IMU may be mounted within an interior region/cavity of an inner housing, which in turn is configured to rotate within an outer housing. In some instances, a mirror assembly may be operatively coupled with the inner housing and permitted to rotate simultaneously with the IMU. Rotation of the inner housing may be achieved, in some example cases, by use of a suitable motor. In some instances, positioning componentry may be operatively coupled with one or more of the IMU and/or mirror assembly. Improvements in mechanical stability, system dimensions, and/or protection from external/environmental hazards may be realized, in some example cases. Numerous configurations and variations will be apparent in light of this disclosure.

General Overview

As previously indicated, there are a number of non-trivial issues that can arise which complicate optical systems including inertial measurement units (IMUs). For instance, one non-trivial issue pertains to the fact that existing optical systems require external mounting of an IMU. As will be appreciated in light of this disclosure, external IMU mounting increases the length and footprint of a given optical system. As will be further appreciated, external mounting of the IMU affords no protection thereof from the surrounding environment. Still further, external mounting of an IMU decreases the mechanical stability of a given optical system.

Thus, and in accordance with an embodiment of the present invention, techniques and architecture are disclosed for providing an optical system having an on-axis, internally mounted inertial measurement unit (IMU). In some such cases, and in accordance with an embodiment, the system may include an inner housing configured to house an IMU (and/or other electronics/componentry) and to rotate within an outer housing of the system, for example, about the azimuth axis of the system. In accordance with an embodiment, effects of such rotation, if any, on measurements made by the IMU may be accounted for by the IMU. In some instances, a mirror assembly may be operatively coupled with the inner housing and thus permitted to rotate simultaneously with the IMU.

Rotation of the inner housing, and thus the IMU and/or mirror assembly, may be achieved, in some example cases, by use of a suitable motor, in accordance with an embodiment. In some embodiments, positioning componentry may be operatively coupled with one or more of the IMU and/or mirror assembly.

Some embodiments of a system provided using the disclosed techniques/architecture may exhibit improvements/enhancements in mechanical stability as compared to existing designs/approaches. Also, some embodiments of a system provided using the disclosed techniques/architecture may realize a reduction in overall length and/or footprint. Furthermore, some embodiments of a system provided using the disclosed techniques/architecture may have improved/enhanced protection, in part or in full, from environmental hazards as compared with existing designs/approaches.

System Architecture and Operation FIGS. 1A and 1B are a front perspective and front cross-sectional view, respectively, of a system 1000 configured in accordance with an embodiment of the present invention. FIGS. 2A and 2B are a side perspective and a side cross-sectional view, respectively, of a system 1000 configured in accordance with an embodiment of the present invention. As can be seen from these figures, system 1000 may include, for example, an outer housing 100 and an inner housing 300 configured to be positioned, at least in part, within outer housing 100. Inner housing 300 can be configured to house any of a number of electronics/components of system 1000, such as, but not limited to, an inertial measurement unit (IMU) 400. In some such cases, IMU 400 may be mounted on-axis within inner housing 300. Also, inner housing 300 can be operatively coupled with an azimuth motor 430 via a drive shaft 630 and thus be provided with the ability to rotate within outer housing 100, as discussed below. In some cases, system 1000 may include one or more optical components, such as, but not limited to: (1) a mirror assembly 500; (2) an azimuth positioning assembly (e.g., azimuth encoder 440, azimuth motor 430, etc.); and/or (3) an elevation positioning assembly (e.g., elevation encoder 540, elevation motor 530, etc.). As will be appreciated in light of this disclosure, system 1000 may include additional, fewer, and/or different elements or components from those here described (e.g., optional base assembly 200, etc.), and the claimed invention is not intended to be limited to any particular system configurations, but can be used with numerous configurations in numerous applications.

Figure 3:
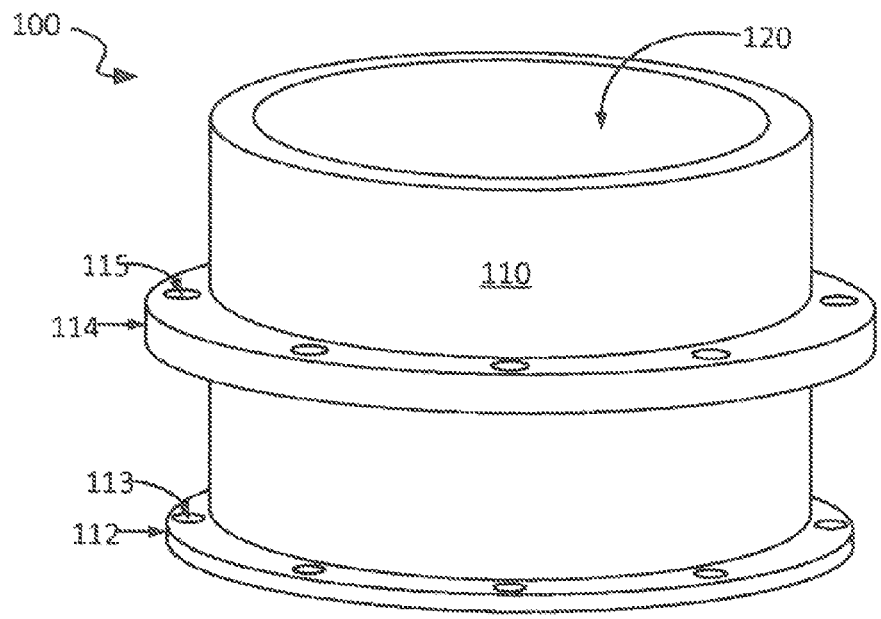
FIG. 3 is a perspective view of an outer housing configured in accordance with an embodiment of the present invention.

FIG. 3 is a perspective view of an outer housing 100 configured in accordance with an embodiment of the present invention. As can be seen, in some embodiments, outer housing 100 may be generally configured as a hollow, substantially cylindrical body 110 (e.g., having a substantially circular cross-sectional geometry) having one or more open ends and an internal region 120 defined there between. In some embodiments, outer housing 100 may be configured, for example, to be operatively coupled with an optional base assembly 200 (discussed below with reference to FIG. 4). To that end, outer housing 100 may be provided, in some embodiments, with a flanged (or otherwise rimmed) portion 112, which may include one or more fastening apertures 113 configured for receiving suitable fasteners for operatively coupling outer housing 100 with an optional base assembly 200 (and/or other structure). However, as will be appreciated in light of this disclosure, outer housing 100 may be operatively coupled with an optional base assembly 200 (and/or other structure) without use of a flanged portion 112, in some other embodiments.

In some cases, a mounting flange (or otherwise rimmed portion) 114 may be provided, for example, on the exterior of body 110. In accordance with an embodiment, mounting flange 114 may be configured to permit outer housing 100 (e.g., and thus system 1000) to be operatively coupled (e.g., mounted or otherwise attached) with one or more external structures (e.g., a chassis, piece of equipment, vehicle, building, bunker, etc.). Mounting flange 114 may be provided with one or more fastening apertures 115 configured for receiving suitable fasteners for operatively coupling outer housing 100 with such an external structure. However, as will be appreciated in light of this disclosure, outer housing 100 may be operatively coupled with a desired external structure without use of a mounting flange 114, in some other embodiments.

In accordance with an embodiment, the dimensions (e.g., outer and/or inner diameters; length/height; etc.) of outer housing 100 may be customized for a given application. In some embodiments, outer housing 100 may be dimensioned such that an inner housing 300 (discussed below with reference to FIG. 5) may be positioned within internal region 120 thereof. In some such cases, the inner diameter of outer housing 100 may be sufficiently large, for example, to allow inner housing 300 to rotate therein (as discussed below with reference to FIG. 7). Also, outer housing 100 may be dimensioned, in some example instances, such that its internal region 120 may house one or more other portions of system 1000 (e.g., a lower bridge assembly 620, a portion of a drive shaft 630, an azimuth motor 430, etc., discussed below).

As will be appreciated, outer housing 100 may be configured to assist with protecting components, structures, electronics, etc., of system 1000 which may be housed therein. Thus, and in accordance with an embodiment, it may be desirable to ensure that outer housing 100 is constructed with material(s) having sufficient structural strength. Some example suitable materials may include, but are not limited to: (1) titanium (Ti); (2) aluminum (Al); (3) steel; (4) an alloy of the aforementioned; and/or (5) any other suitable material/metal as will be apparent in light of this disclosure. Other suitable configurations, dimensions, materials, and/or structural considerations for outer housing 100 will depend on a given application and will be apparent in light of this disclosure.

Figure 4:
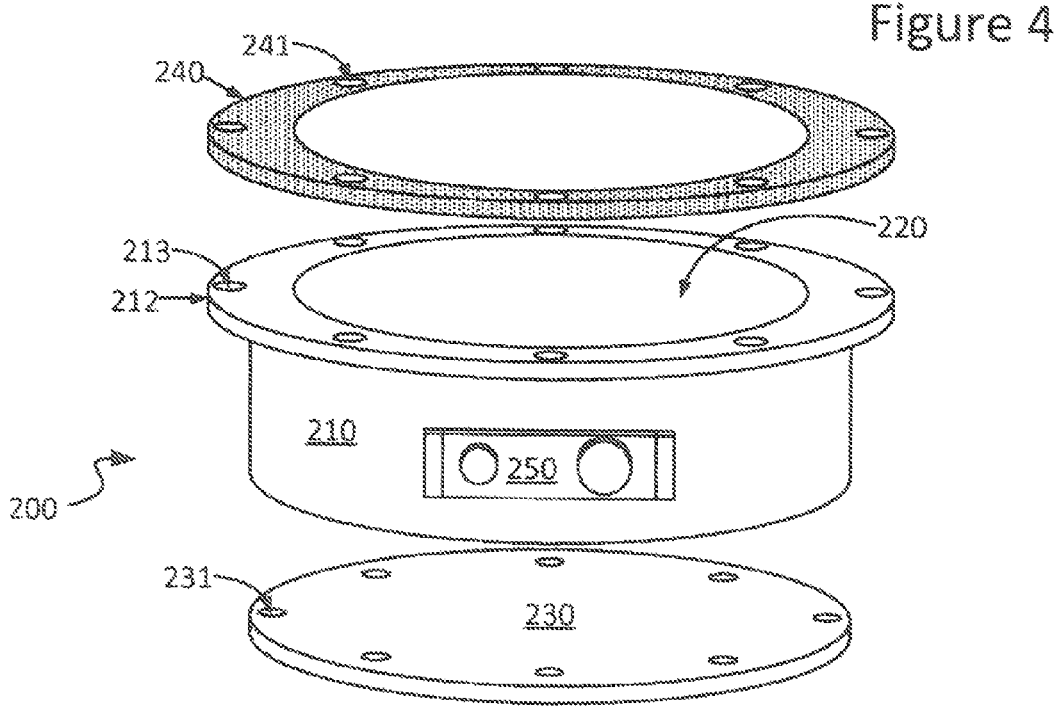
FIG. 4 is an exploded perspective view of an optional base assembly configured in accordance with an embodiment of the present invention.

As previously noted, outer housing 100 may be operatively coupled with an optional base assembly 200 in some embodiments. FIG. 4 is an exploded perspective view of an optional base assembly 200 configured in accordance with an embodiment of the present invention. As can be seen, optional base assembly 200 may include, for example, a housing base 210, a base plate 230, a thermal isolator 240, and/or an interface 250. Other suitable components and/or configurations for optional base assembly 200, when included, will depend on a given application and will be apparent in light of this disclosure.

When included, housing base 210 may be generally configured as a hollow, substantially cylindrical body (e.g., having a substantially circular cross-sectional geometry) having one or more open ends and an internal region 220 defined there between. In some embodiments, housing base 210 may be configured, for example, to be operatively coupled with outer housing 200 at an end thereof (as previously discussed). To that end, housing base 210 may be provided, in some embodiments, with a flanged (or otherwise rimmed) portion 212, which may include one or more fastening apertures 213 configured for receiving suitable fasteners for operatively coupling housing base 210 with outer housing 100. However, as will be appreciated in light of this disclosure, housing base 210 may be operatively coupled with outer housing 100 without use of a flanged portion 212, in some other embodiments.

In accordance with an embodiment, the dimensions (e.g., outer and/or inner diameters; length/height; etc.) of housing base 210 may be customized for a given application. In some embodiments, housing base 210 may be dimensioned with an outer and/or inner diameter which substantially matches that/those of outer housing 100. Also, housing base 210 may be dimensioned, in some example instances, to house one or more other portions of system 1000 (e.g., a lower bridge assembly 620, a portion of a drive shaft 640, an azimuth motor 430, etc., discussed below). When included, housing base 210 may be configured so as to not interfere with or otherwise affect the ability of inner housing 300 to rotate within outer housing 100.

Much like outer housing 100, housing base 210 may be configured to assist with protecting components, structures, electronics, etc., of system 1000 which may be housed therein. Thus, and in accordance with an embodiment, it may be desirable to ensure that housing base 210 is constructed with material(s) having sufficient structural strength. Some example suitable materials may include, but are not limited to, any one or more of those discussed above with reference to outer housing 100. In some cases, and in accordance with an embodiment, it may be desirable to construct housing base 210 from the same material(s), for example, as outer housing 100 to help minimize (or otherwise reduce) complications which otherwise may result from coefficient of thermal expansion (CTE) mismatching. Other suitable configurations, dimensions, materials, and/or structural considerations for housing base 210, when included, will depend on a given application and will be apparent in light of this disclosure.

In some cases, optional base assembly 200 may include a thermal isolator 240 configured to be disposed, for example, between housing base 210 and outer housing 100. Thermal isolator 240 may be configured to assist with preventing (or otherwise reducing) heat transfer, for example, from outer housing 100 (and/or any components housed thereby or operatively coupled therewith) to housing base 210 (and/or any components contained therein or operatively coupled therewith). Thus, and in accordance with an embodiment, it may be desirable to ensure that thermal isolator 240 is constructed with material(s) having sufficient thermal insulation capabilities. Some example suitable materials may include, but are not limited to: (1) glass-reinforced epoxy laminate (e.g., G10 plastic); (2) fiberglass; (3) printed circuit board (PCB) material; (4) a combination of the aforementioned; and/or (5) any other suitable thermal insulating material as will be apparent in light of this disclosure.

In accordance with an embodiment, the dimensions of thermal isolator 240 may be customized for a given application. In some embodiments, thermal isolator 240 may be dimensioned with an outer and/or inner diameter which substantially matches that/those of outer housing 100 and/or housing base 210. Also, thermal isolator 240 may include (or otherwise be capable of having formed therein) one or more fastening apertures 241 configured for receiving suitable fasteners for positioning/securing thermal isolator 240 between outer housing 100 and housing base 210. When included, thermal isolator 240 may be configured so as to not interfere with or otherwise affect the ability of inner housing 300 to rotate within outer housing 100. Other suitable configurations, materials, and/or structural considerations for thermal isolator 240 will depend on a given application and will be apparent in light of this disclosure.

In some cases, optional base assembly 200 may include a base plate 230 configured to be operatively coupled, for example, with an open end of housing base 210 (e.g., an open end of housing base 210 which is not to be operatively coupled with outer housing 100). Base plate 230 may be configured, for example, to assist with protecting any components which may be housed or otherwise provided within housing base 210 by sealing/closing an open end of housing base 210. In some cases, base plate 230 may be configured to assist with providing housing base 210 (and thus system 1000) with a desired degree of environmental sealing. However, as will be appreciated, base plate 230 alternatively may be configured to seal/close an end of housing base 210 without providing an environmental seal, in some other embodiments. Thus, and in accordance with an embodiment, it may be desirable to ensure that base plate 230 is constructed with material(s) having sufficient structural strength. Some example suitable materials may include, but are not limited to, any one or more of those discussed above with reference to housing base 210. In some cases, and in accordance with an embodiment, it may be desirable to construct base plate 230 from the same material(s), for example, as housing base 210 to help minimize (or otherwise reduce) complications which otherwise may result from coefficient of thermal expansion (CTE) mismatching.

In accordance with an embodiment, the dimensions of base plate 230 may be customized for a given application. In some embodiments, base plate 230 may be dimensioned with a diameter/width which substantially matches that of housing base 210. Also, base plate 230 may include one or more fastening apertures 231 configured for receiving suitable fasteners for operatively coupling base plate 230 with housing base 210. When included, base plate 230 may be configured so as to not interfere with or otherwise affect the ability of inner housing 300 to rotate within outer housing 100. Other suitable configurations, materials, and/or structural considerations for base plate 230 will depend on a given application and will be apparent in light of this disclosure.

In some cases, optional base assembly 200 may include an interface 250 configured to be operatively coupled with external componentry (e.g., a power supply, a data processor, etc.). In some embodiments, interface 250 may be formed in or otherwise operatively coupled, for example, with housing base 210. In some instances, interface 250 may be configured to be operatively coupled with one or more power supplies, for example, for powering any of the components of system 1000 (e.g., IMU 400, azimuth motor 430, azimuth encoder 440, elevation motor 530, and/or elevation encoder 540, etc.). In some instances, interface 250 may be configured to be operatively coupled with one or more data processing components, for example, for processing data provided by any of the components of system 1000 (e.g., IMU 400, azimuth motor 430, azimuth encoder 440, elevation motor 530, and/or elevation encoder 540, etc.). Other suitable configurations and/or capabilities of interface 250 will depend on a given application and will be apparent in light of this disclosure.

Figure 5:
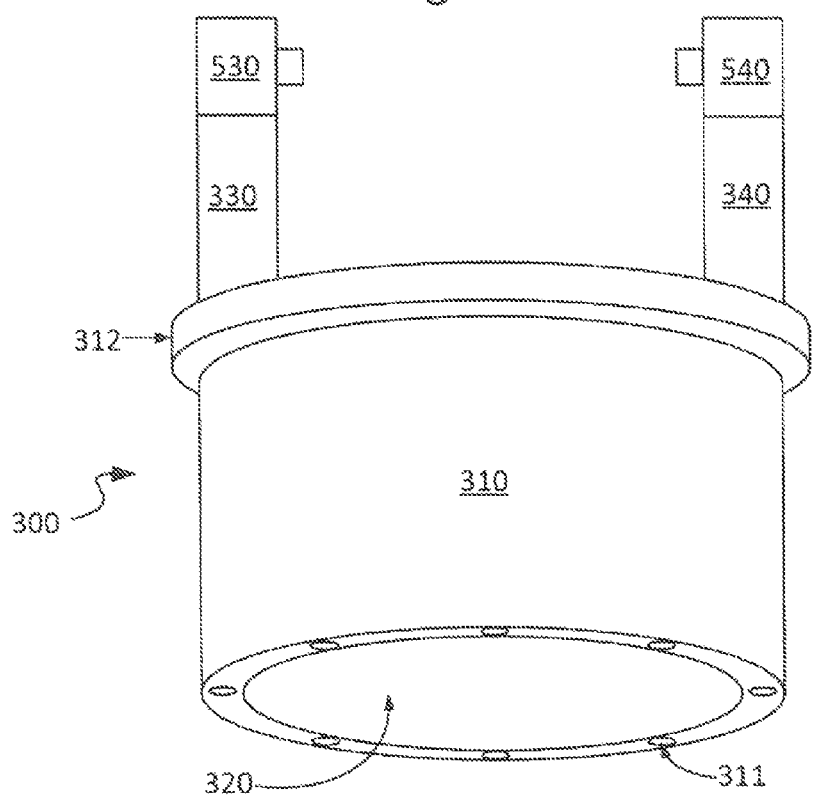
FIG. 5 is a perspective view of an inner housing configured in accordance with an embodiment of the present invention.

FIG. 5 is a perspective view of an inner housing 300 configured in accordance with an embodiment of the present invention. As can be seen, in some embodiments, inner housing 300 may be generally configured as a hollow, substantially cylindrical body 310 (e.g., having a substantially circular cross-sectional geometry) having one or more open ends. In some cases, one or more of the ends of inner housing 300 may be sealed or otherwise closed, for example, by: (1) constructing inner housing 300 to have a continuous end wall which provides an integral end surface 312; and/or (2) operatively coupling an appropriate structure (e.g., a plate similar to the base plate 230 described above; a capping plate 333, discussed below; etc.) with inner housing 300 to provide end surface 312. In some instances, end surface 312 (whether integral to inner housing 300 or operatively coupled thereto) may be flanged or otherwise rimmed, such as can be seen with particular reference to FIG. 5. In some such cases, a flanged end surface 312 may be configured to rest on or otherwise be proximate to a given end of outer housing 100, as can be seen best from FIGS. 1B and 2B.

In accordance with an embodiment, the dimensions (e.g., outer and/or inner diameters; length/height; etc.) of inner housing 300 may be customized for a given application. In some embodiments, inner housing 300 may be dimensioned such that it may be positioned, at least in part, within outer housing 100 (e.g., within internal region 120) and permitted to extend out of one or more ends of the outer housing 100. In some such cases, the outer diameter of inner housing 300 may be dimensioned sufficiently smaller, for example, than the inner diameter of outer housing 100 to allow inner housing 300 to rotate within internal region 120 of outer housing 100 (as discussed below with reference to FIG. 7). Also, inner housing 300 may be dimensioned, in some example instances, to house one or more other portions of system 1000 (e.g., IMU 400, mounting site 410, support bar 332, connector 334, etc., discussed below with reference to FIG. 6).

As can be seen from FIG. 5, for example, inner housing 300 may be provided with an internal cavity 320. In accordance with an embodiment, internal cavity 320 may be configured to house and/or protect componentry (e.g., IMU 400, etc.) of system 1000 which may be disposed therein. In some instances, internal cavity 320 may constitute a substantial portion (e.g., greater than 50%; greater than 60%; greater than 70%; greater than 80%; etc.) of the volume of inner housing 300. In some embodiments, internal cavity 320 may be partitioned or otherwise compartmentalized, in part or in whole. Other suitable configurations and/or considerations for internal cavity 320 will depend on a given application and will be apparent in light of this disclosure.

As can be seen in FIGS. 1A-1B, for example, inner housing 300 may be configured with one or more projections/arms 330, 340, etc., extending therefrom (e.g., in the direction substantially opposite the location of internal cavity 320). In some instances, the one or more projections 330/340 may be integral with end surface 312 (e.g., depicted in FIG. 5), while in some other instances, projections 330/340 may be operatively coupled with end surface 312. In some cases in which two or more projections 330/340 are provided, such projections 330/340 may be distally spaced from one another (e.g., across the breadth of end surface 312). As can further be seen from the figures, projections 330/340 may be configured, for example, to have a mirror assembly 500 (discussed below) operatively coupled there between. Other suitable configurations and/or considerations for the one or more projections 330/340 will depend on a given application and will be apparent in light of this disclosure.

In accordance with an embodiment, inner housing 300 may be configured to assist with: (1) protecting components, structures, electronics, etc., of system 1000 which may be housed therein; and/or (2) supporting components, structures, electronics, etc., of system 1000 which may be operatively coupled therewith. Thus, and in accordance with an embodiment, it may be desirable to ensure that inner housing 300 is constructed with material(s) having sufficient structural strength. Some example suitable materials may include, but are not limited to, any one or more of those discussed above with reference to outer housing 100. As will be appreciated, it may be desirable to ensure that inner housing 300 is made from the same material(s), for example, as outer housing 100 to minimize (or otherwise reduce) complications which may arise from coefficient of thermal expansion (CTE) mismatching. Other suitable configurations, dimensions, materials, and/or structural considerations for inner housing 300 will depend on a given application and will be apparent in light of this disclosure.

As previously noted, in some cases a mirror assembly 500 may be operatively coupled, for example, with the one or more of projections 330/340 of inner housing 300. In some example embodiments, mirror assembly 500 may include a mirror 510 and/or a bezel 520 operatively coupled with the mirror 510 and configured to assist with operatively coupling mirror 510 with system 1000 (e.g., between projections 330/340). Mirror 510 may be configured to direct incident light onto an optical sensor of system 1000. Any suitable mirror 510 may be implemented, and some example types may include, but are not limited to: (1) a stabilized mirror; (2) a tilt mirror; and/or (3) a two-axis mirror. By virtue of how it is operatively coupled with inner housing 300 (e.g., at projections 330/340), mirror 510 may be configured to function along the roll axis and/or along the pitch axis. As can be seen from FIG. 1B, for example, mirror assembly 500 may be permitted to rotate, in part or in whole, about an elevation axis and/or an azimuth axis of system 1000.

In some cases, mirror assembly 500 may be operatively coupled, for example, with one or more elevation positioning components. For instance, in some embodiments, mirror assembly 500 may be operatively coupled with: (1) an elevation motor 530; and/or (2) an elevation encoder 540. When included, elevation motor 530 may be positioned on or otherwise operatively coupled, for example, with a projection 330 of inner housing 300. In accordance with an embodiment, elevation motor 530 may be configured to engage mirror assembly 500 to change its position/orientation (e.g., elevation, pitch, etc.). Similarly, elevation encoder 540 may be positioned on or otherwise operatively coupled, for example, with a projection 340 of inner housing 300. In accordance with an embodiment, elevation encoder 540 may be configured to measure or otherwise determine the position/orientation (e.g., elevation, pitch, etc.) of mirror assembly 500. In some cases, elevation encoder 540 may be operatively coupled, for example, with electronic componentry (e.g., a computer or other data acquisition device) configured to receive positioning/orientation data from elevation encoder 540. As will be appreciated, such componentry may be configured to subsequently transmit data/instructions to elevation motor 530, for example, to change the positioning/orientation of mirror assembly 500. Other suitable configurations and/or considerations for elevation motor 530 and/or elevation encoder 540 will depend on a given application and will be apparent in light of this disclosure.

Figure 6:
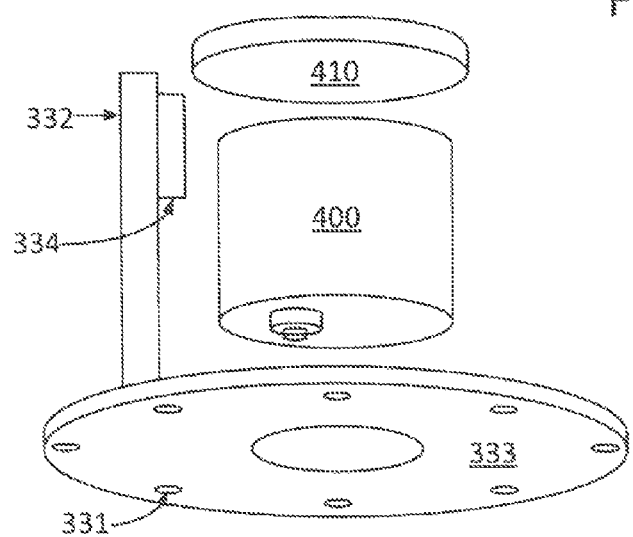
FIG. 6 is an exploded perspective view of an inertial measurement unit (IMU) and an optional capping plate configured in accordance with an embodiment of the present invention.

FIG. 6 is an exploded perspective view of an inertial measurement unit (IMU) 400 and an optional capping plate 330 configured in accordance with an embodiment of the present invention. As previously noted, in some cases an IMU 400 may be operatively coupled, for example, with inner housing 300. In some specific example instances, IMU 400 may be configured to be disposed within internal cavity 320 of inner housing 300. In accordance with an embodiment, system 1000 may be configured, for example, for internal, on-axis mounting of an IMU 400 (as can be seen with particular reference to FIGS. 1B and 2B).

As used herein, an inertial measurement unit (IMU) 400 may refer to a device that can measure and/or report on inertial rotation rates and/or inertial acceleration in system 1000. In some embodiments, IMU 400 may include one or more accelerometers, gyroscopes, and/or magnetometers. IMU 400 may be configured, in accordance with an embodiment, to detect changes in pitch, roll, and/or yaw in a system 1000. In some such cases, these types of changes may be detected in one, two, and/or three dimensions (e.g., a one-axis, two-axis, and/or three-axis IMU) in a simultaneous or separate fashion. In some specific example cases, IMU 400 may include or otherwise be operatively coupled with an inertial navigation system (INS). Other suitable configurations for an IMU 400 will depend on a given application and will be apparent in light of this disclosure.

As can be seen with reference to FIGS. 5 and 6, for example, by virtue of placement within inner housing 300 (and thus outer housing 100), in some embodiments IMU 400 may be protected from external environmental hazards. In some cases, IMU 400 may be operatively coupled with end surface 312 (e.g., on the side of end surface 312 which defines, in part, the bounds of internal cavity 320). In accordance with an embodiment, IMU 400 may be configured to function, for example: (1) on the azimuth axis; and/or (2) on the pitch axis. Also, as discussed below, and in accordance with an embodiment, IMU 400 may be permitted to rotate on the azimuth axis of system 1000 by virtue of its operative coupling with inner housing 300.

In some cases, a mounting site 410 may be provided for operatively coupling IMU 400 (and/or other electronics/components) with inner housing 300. As can be seen with reference to FIGS. 5 and 6, for example, mounting site 410 may be configured to be disposed within internal cavity 320 of inner housing 300. In some example instances, mounting site 410 may be operatively coupled with end surface 312 (e.g., on the side of end surface 312 which defines, in part, the bounds of internal cavity 320) and configured to have IMU 400 operatively coupled therewith. In some other example instances, mounting site 410 may be integral to inner housing 300 (e.g., integral with end surface 312 and oriented toward internal cavity 320) and configured to have IMU 400 operatively coupled therewith. Other suitable configurations and/or considerations for mounting site 410 will depend on a given application and will be apparent in light of this disclosure.

As previously noted, it may be desirable in some cases to seal/close a given open end of inner housing 300. To that effect, and in accordance with an embodiment, a capping plate 330 may be operatively coupled with a given open end of inner housing 300. In some cases, a capping plate 330 may be operatively coupled with (e.g., fastened to, seated on, etc.) the open end opposite the sealed/closed end surface 312 while positioned within internal region 120 of outer housing 100. Capping plate 330 may be configured, for example, to assist with protecting any components which may be housed or otherwise provided within internal cavity 320 of inner housing 300 by sealing/closing an open end of inner housing 300.

In accordance with an embodiment, the dimensions (e.g., diameter/width; thickness; etc.) of capping plate 330 may be customized for a given application. In some embodiments, capping plate 330 may be dimensioned with a diameter/width which: (1) substantially matches that of the end of inner housing 300 with which it is to be operatively coupled; and/or (2) is sufficiently smaller, for example, than the inner diameter of outer housing 100 (e.g., the diameter of internal region 120) to preserve the ability of inner housing 300 to rotate within outer housing 100 (as discussed below with reference to FIG. 7). Also, capping plate 330 may include one or more fastening apertures 331 configured for receiving suitable fasteners for operatively coupling capping plate 330 with inner housing 300. When included, capping plate 330 may be configured so as to not interfere with or otherwise affect the ability of inner housing 300 to rotate within outer housing 100.

In some cases, a support bar 332 may be provided, for example, to assist with supporting wiring and/or electronics to be positioned within internal cavity 320. In some instances, support bar 332 may be operatively coupled with capping plate 330 and configured to extend into internal cavity 320 to a given depth (e.g., the entire depth of internal cavity 320 or some lesser depth thereof). In some other instances, support bar 332 may be integral with capping plate 330 and configured to extend into internal cavity 320. In some embodiments, support bar 332 may include a connector 334 operatively coupled therewith for interfacing with any electronic componentry which may be disposed within internal cavity 320 (e.g., IMU 400, etc.).

In accordance with an embodiment, capping plate 330 may be configured to assist with protecting components, structures, electronics, etc., of system 1000 which may be housed within internal cavity 320 of inner housing 300. Thus, and in accordance with an embodiment, it may be desirable to ensure that capping plate 330 is constructed with material(s) having sufficient structural strength. Some example suitable materials may include, but are not limited to, any one or more of those discussed above with reference to inner housing 300. In some cases, and in accordance with an embodiment, it may be desirable to construct capping plate 330 (and support bar 332, when included) from the same material(s), for example, as inner housing 300 to help minimize (or otherwise reduce) complications which otherwise may result from coefficient of thermal expansion (CTE) mismatching. Other suitable configurations, dimensions, materials, and/or structural considerations for capping plate 330 will depend on a given application and will be apparent in light of this disclosure.

Figure 7:
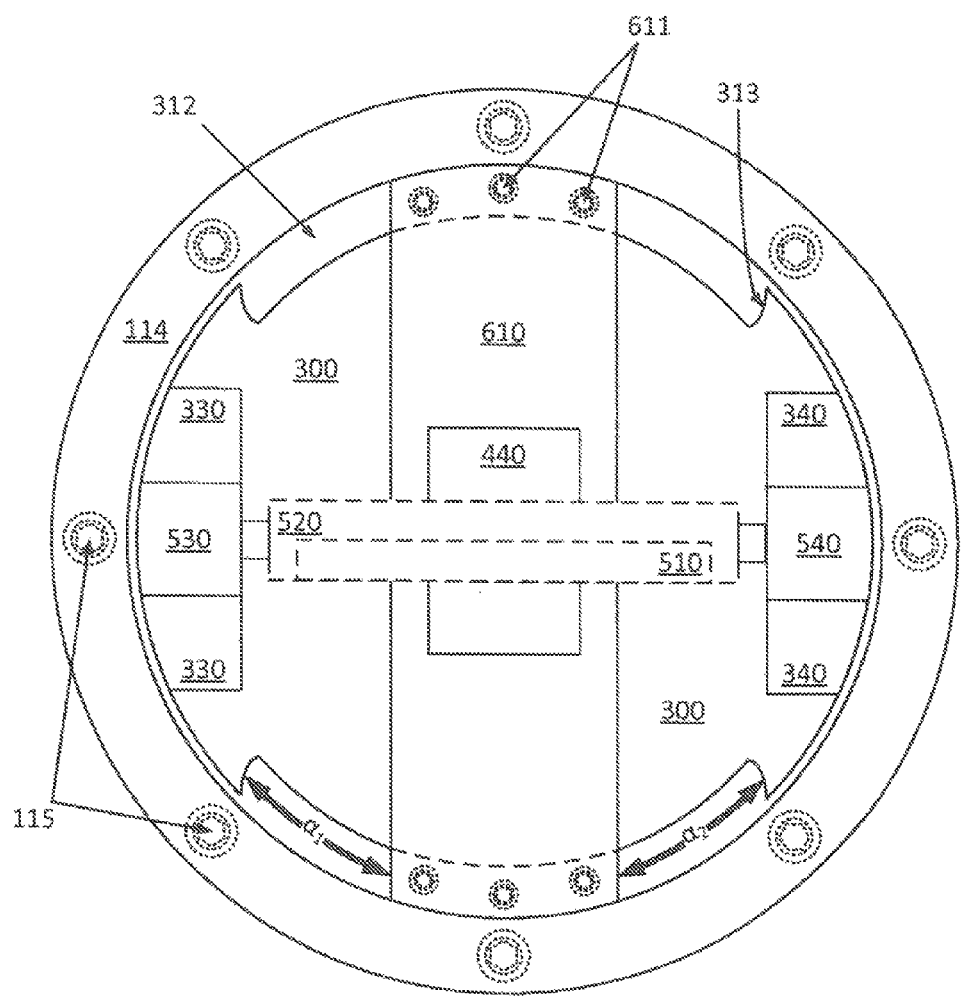
FIG. 7 is a top-down perspective view of a system configured in accordance with an embodiment of the present invention.

As previously noted, system 1000 may be configured, in accordance with an embodiment, such that inner housing 300 can be caused and/or permitted to rotate within outer housing 100 (e.g., within internal region 120 thereof) through a given range of motion (discussed below with reference to FIG. 7). To assist with enabling inner housing 300 to rotate within outer housing 100, one or more of an upper bridge assembly 610 and/or a lower bridge assembly 620 may be included in system 1000. In one specific example embodiment, upper bridge assembly 610 may be configured to be operatively coupled with outer housing 100, for example, between or otherwise proximate projections 330/340 (e.g., as can best be seen from FIGS. 1A and 2A). In some cases, upper bridge assembly 610 may be configured to pass over end surface 312 of inner housing 300 (e.g., as can best be seen from FIGS. 2A and 2B), thus permitting inner housing 300 to rotate there under. As will be appreciated, it may be desirable to provide upper bridge assembly 610 with one or more fastening apertures 611 configured for receiving suitable fasteners for operatively coupling upper bridge assembly 610 with outer housing 100.

Also, lower bridge assembly 620 may be configured to be operatively coupled with outer housing 100, for example, within internal region 120 (e.g., as can best be seen from FIGS. 1B and 2B). In some cases, lower bridge assembly 620 may be configured to be positioned adjacent capping plate 333, thus permitting inner housing 300 to rotate there above. As will be appreciated, it may be desirable to construct upper bridge assembly 610 and/or lower bridge assembly 620 from the same material(s) as outer housing 100, for example, to help minimize (or otherwise reduce) complications which otherwise may result from coefficient of thermal expansion (CTE) mismatching. Other suitable configurations and/or considerations for upper bridge assembly 610 and/or lower bridge assembly 620 will depend on a given application and will be apparent in light of this disclosure.

To further assist with enabling inner housing 300 to rotate within outer housing 100, a drive shaft 630 may be included in system 1000. In accordance with an embodiment, drive shaft 630 may be configured to be operatively coupled with inner housing 300. In one specific example case, a first portion of drive shaft 630 may be configured, for example, to be operatively coupled with end surface 312 of inner housing 300, while another portion of drive shaft 630 may be configured, for example, to be operatively coupled with capping plate 333. Thus, by virtue of such operative coupling, and in accordance with an embodiment, rotation of drive shaft 630 may result in rotation of inner housing 300 within internal region 120 of outer housing 100.

As can be seen from FIGS. 1B and 2B, for example, upper bridge assembly 610 and/or lower bridge assembly 620 may be configured to receive at least a portion of drive shaft 630. In some cases, one or more arrangements of bearings 640 may be included between drive shaft 630 and a given bridge assembly 610 and/or 620, for example, to assist with rotation of drive shaft 630. As will be appreciated in light of this disclosure, and in accordance with an embodiment, any of a wide variety of bearings may be utilized. For instance, in one specific example embodiment, a given arrangement of bearings 640 may include duplex bearings, the inner hollow of which (e.g., formed by the inner races thereof) may be configured to receive a portion of the drive shaft 630.

In one specific example embodiment, a duplex bearing arrangement may be included within each of upper bridge assembly 610 and lower bridge assembly 620. In some such cases, one duplex bearing arrangement may be clamped axially within its corresponding bridge assembly (e.g., upper bridge assembly 610), while the other duplex bearing arrangement may be left floating within its corresponding bridge assembly (e.g., lower bridge assembly 620). In some other such cases, the duplex bearing arrangement in lower bridge assembly 620 may be clamped axially, whereas the duplex bearing arrangement in upper bridge assembly 610 may be left floating. The decision as to which duplex bearing arrangement to allow to float, if any, may be based in part on which characteristics and/or behaviors of the system 1000 are to be controlled. In either case, allowing one duplex bearing arrangement to float while clamping the other duplex bearing arrangement may accommodate coefficient of thermal expansion (CTE) mismatching, if any, between the materials utilized in bearings 640 and the materials utilized in upper bridge assembly 610, lower bridge assembly 620, and/or drive shaft 630.

In some cases, drive shaft 630 may be operatively coupled, for example, with one or more azimuth positioning components. For instance, in some embodiments, drive shaft 630 may be operatively coupled with: (1) an azimuth motor 430; and/or (2) an azimuth encoder 440. When included, azimuth motor 430 may be configured to be positioned within outer housing 100 (and/or optional housing base 210) and operatively coupled, for example, with the portion of drive shaft 630 within lower bridge assembly 620. In accordance with an embodiment, azimuth motor 430 may be configured to engage drive shaft 630 to cause rotation thereof (e.g., about the azimuth axis). By virtue of how drive shaft 630 may be operatively coupled with inner housing 300 (e.g., at capping plate 330), rotation of drive shaft 630 via azimuth motor 430 may cause corresponding rotation of inner housing 300 within internal region 120 of outer housing 100. When included, azimuth encoder 440 may be configured to be positioned on upper bridge assembly 610 (e.g., outside of inner housing 300) and operatively coupled, for example with the portion of drive shaft 630 within upper bridge assembly 610. In accordance with an embodiment, azimuth encoder 440 may be configured to measure or otherwise determine the angular positioning of drive shaft 630 (e.g., and thus inner housing 300, and thus mirror assembly 500). In some cases, azimuth encoder 440 may be operatively coupled, for example, with electronic componentry (e.g., a computer or other data acquisition device) configured to receive positioning/orientation data from azimuth encoder 440. As will be appreciated, such componentry may be configured to subsequently transmit data/instructions to azimuth motor 430, for example, to change the positioning/orientation of drive shaft 630 (e.g., and thus inner housing 300, and thus mirror assembly 500). Other suitable configurations and/or considerations for azimuth motor 430 and/or azimuth encoder 440 will depend on a given application and will be apparent in light of this disclosure.

As previously noted, and in accordance with an embodiment, system 1000 can be configured to allow for inner housing 300 to rotate within internal region 120 of outer housing 100 through any desired range of rotational motion. For instance, consider FIG. 7, which is a top-down perspective view of a system 1000 configured in accordance with an embodiment of the present invention. As can be seen, inner housing 300 may be provided with the ability to rotate through an angle $\alpha_1 + \alpha_2$. In some such cases, the value of angle $\alpha_1 + \alpha_2$ may be defined, at least in part, by virtue of a given configuration of system 1000 (e.g., by the configuration of upper bridge assembly 610, end surface 312, inner housing 300, and/or projections 330/340, etc.). In one specific example embodiment, inner housing 300 may be permitted to rotate within outer housing 100 through an angle $\alpha_1 + \alpha_2$ in the range of less than or equal to about ±40°. It should be noted, however, that the claimed invention is not so limited, and a given system 1000 may be configured, in accordance with an embodiment, to permit larger and/or smaller rotational ranges for inner housing 300, as desired for a given target application.

In some cases, a desired range of motion may result from or otherwise be provided by the physical structure/configuration of system 1000. For instance, as can be seen from the example embodiment of FIG. 7, end surface 312 of inner housing 300 can be configured with one or more stopping features 313 which are designed to prevent further rotation of inner housing 300 upon incidence with upper bridge assembly 610. In some other cases, azimuth motor 430 itself may be configured to provide the desired range of motion. Numerous techniques for providing a desired range of motion will be apparent in light of this disclosure.

In some instances, inner housing 300 may be permitted to rotate freely within outer housing 100. In some other instances, inner housing 300 may be permitted to rotate within outer housing 100 under the direction and/or application of an external force and/or component (e.g., azimuth motor 430).

By virtue of how IMU 400 may be operatively coupled with inner housing 300, which in turn may be operatively coupled with drive shaft 630, rotation of drive shaft 630 (e.g., by azimuth motor 430 and/or other force/component) may result in a corresponding rotation of IMU 400, for instance, about the azimuth axis of system 1000. In some cases, and in accordance with an embodiment, IMU 400 may be configured to account for effects of such rotation, if any, on its measurements.

By virtue of how mirror assembly 500 may be operatively coupled with inner housing 300 (e.g., at projections 330/340), which in turn may be operatively coupled with drive shaft 630, rotation of drive shaft 630 (e.g., by azimuth motor 430 and/or other force/component) may result in a corresponding rotation of mirror assembly 500, for instance, about the azimuth axis of system 1000. Thus, as will be appreciated, IMU 400 and mirror assembly 500 may be made to rotate simultaneously about the azimuth axis of system 1000, in accordance with an embodiment.

As previously noted, it may be desirable to ensure that system 1000, in part or in whole, includes environmental sealing provisions which may help to protect internally housed optics/electronics from external environmental hazards over a broad range of temperatures and/or operating conditions. For example, system 1000 may be configured to protect its internal volume from a variety of external environmental hazards, such as, but not limited to: (1) water (e.g., rain, humidity, moisture, steam); (2) corrosive fluids/vapors (e.g., fuels, lubricants/greases, brake fluids, solvents, ozone); (3) particulates (e.g., dust, smoke); and/or (4) debris. In accordance with an embodiment, such environmental sealing provisions may be made, for example, with respect to any of outer housing 100, inner housing 300, optional base assembly 200, and/or any other portion(s) of system 1000.

Also, as previously noted, it may be desirable to ensure that the various components of system 1000 are constructed of material(s) capable of use in a wide range of environments, temperatures, and/or stressors. Such materials may include, but are not limited to, titanium, steel, aluminum, etc. One or more of the various components of system 1000 may be constructed of a single material or any combination of materials. Embodiments in which the various components are constructed of varied materials different from one another may be realized. Furthermore, one or more components may be constructed of a single material or any combination of materials thus making system 1000 suitable for use in the context of a wide range of environments, temperatures, and/or stressors. In some embodiments, all components of system 1000 may be made of a single type of material to minimize or otherwise reduce coefficient of thermal expansion (CTE) mismatch complications, if any.

In some embodiments, one or more of the various components of system 1000 discussed above may be formed using techniques to ensure precise balancing, alignment, orientation, etc., thereof. In some cases, one or more components of system 1000 may be formed at the same time as another component to ensure a paired precision relationship. Such precision formation may assist, for example, with reducing friction and thus heat which may be experienced by system 1000, thereby allowing for better maintenance of system accuracy.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system comprising:
   a first housing having a first cavity provided therein;
   a second housing having a second cavity provided therein, wherein the second housing is disposed within the first cavity and permitted to rotate therein;
   at least one of an upper bridge assembly and a lower bridge assembly, wherein said at least one of the upper bridge assembly and the lower bride assembly is operatively coupled to the second housing;
   an optical assembly operatively coupled with the second housing;
   an inertial measurement unit (IMU) operatively coupled with the second housing and positioned within the second cavity along an axis of rotation of the first housing and the second housing;
   a drive motor operatively coupled with the second housing, via said at least one of the upper bridge assembly and the lower bride assembly, and configured to cause rotation of the second housing; and
   a base assembly operatively coupled with the first housing, wherein the base assembly includes at least one of a thermal isolator and a power supply interface;
   wherein the rotation of the second housing results in rotation of the optical assembly and the IMU therewith.

2. The system of claim 1, wherein rotation of the second housing is limited to a range of less than or equal to ±40°.

3. The system of claim 1, wherein the optical assembly is permitted to rotate about at least one of an azimuthal axis of the system and an elevation axis of the system, and the IMU is permitted to rotate about the azimuthal axis of the system.

4. The system of claim 1, wherein the IMU is configured to account for effects of rotation on measurements that it makes.

5. The system of claim 1, wherein the IMU is a one-axis, two-axis, or three-axis IMU.

6. A system comprising:
   a first housing having a first cavity provided therein;
   a second housing having a second cavity provided therein, wherein the second housing is disposed within the first cavity and permitted to rotate therein;
   an inertial measurement unit (IMU) operatively coupled with the second housing and positioned within the second cavity along an axis of rotation of the first housing and the second housing;
   a mirror operatively coupled with the second housing;
   an elevation motor operatively coupled with the mirror and configured to cause rotation thereof about an elevation axis of the system; and
   an azimuthal motor operatively coupled with the second housing and configured to cause rotation thereof about an azimuthal axis of the system;
   wherein the rotation of the second housing results in rotation of the mirror and the IMU therewith about the azimuthal axis of the system.

* * * * *